(12) United States Patent
Yatsuda et al.

(10) Patent No.: US 8,382,352 B2
(45) Date of Patent: Feb. 26, 2013

(54) PROJECTOR-TYPE HEADLIGHT AND CONFIGURATION STRUCTURE OF RESIN PROJECTOR LENS THEREOF

(75) Inventors: Yasushi Yatsuda, Yokohama (JP); Yoshihiro Nakata, Yokohama (JP); Eiji Kawamoto, Tokyo-to (JP)

(73) Assignee: Stanley Electric Co., Ltd., Tokyo (JP)

( * ) Notice: Subject to any disclaimer, the term of this patent is extended or adjusted under 35 U.S.C. 154(b) by 245 days.

(21) Appl. No.: 13/006,646

(22) Filed: Jan. 14, 2011

(65) Prior Publication Data

US 2011/0170306 A1 Jul. 14, 2011

(30) Foreign Application Priority Data

Jan. 14, 2010 (JP) ................................. 2010-005747

(51) Int. Cl.
*B60Q 1/04* (2006.01)
*F21V 5/00* (2006.01)

(52) U.S. Cl. .......................... 362/539; 362/326; 362/520

(58) Field of Classification Search .................. 362/326, 362/328, 335, 512, 520, 538, 539
See application file for complete search history.

(56) References Cited

U.S. PATENT DOCUMENTS

| 4,941,072 | A  | * | 7/1990 | Yasumoto et al. | 362/335 |
| 6,501,605 | B2 | * | 12/2002 | Moriya | 359/819 |
| 7,419,315 | B2 | * | 9/2008 | Hirata et al. | 396/529 |
| 7,563,008 | B2 | * | 7/2009 | Chinniah et al. | 362/520 |
| 8,075,166 | B2 | * | 12/2011 | Ohno et al. | 362/538 |
| 8,142,084 | B2 | * | 3/2012 | Takada et al. | 396/427 |
| 8,259,402 | B2 | * | 9/2012 | Lin et al. | 359/819 |
| 2010/0220461 | A1 | * | 9/2010 | Naijo | 362/241 |

FOREIGN PATENT DOCUMENTS

JP 2008-103192 A 5/2008

* cited by examiner

*Primary Examiner* — Alan Cariaso
(74) *Attorney, Agent, or Firm* — Kenealy Vaidya LLP

(57) ABSTRACT

Disclosed is a projector-type headlight that can include a light emitting device, a reflector having a reflection surface to reflect a light from the light emitting device forward, a projector lens to project the reflected light from the reflection surface forward, the projector lens being a resin molding, and a shade to form a light distribution pattern having a light-dark border line by blocking a part of the reflected light heading from the reflection surface to the projector lens. A gate trace can be formed in a circumference portion of the projector lens. The gate trace can be provided lower than a horizontal surface on which a light axis of the projector lens passes through, and at the same time can be provided in a state of being shifted either leftward or rightward from a vertical surface on which the light axis of the projector lens passes through.

7 Claims, 14 Drawing Sheets

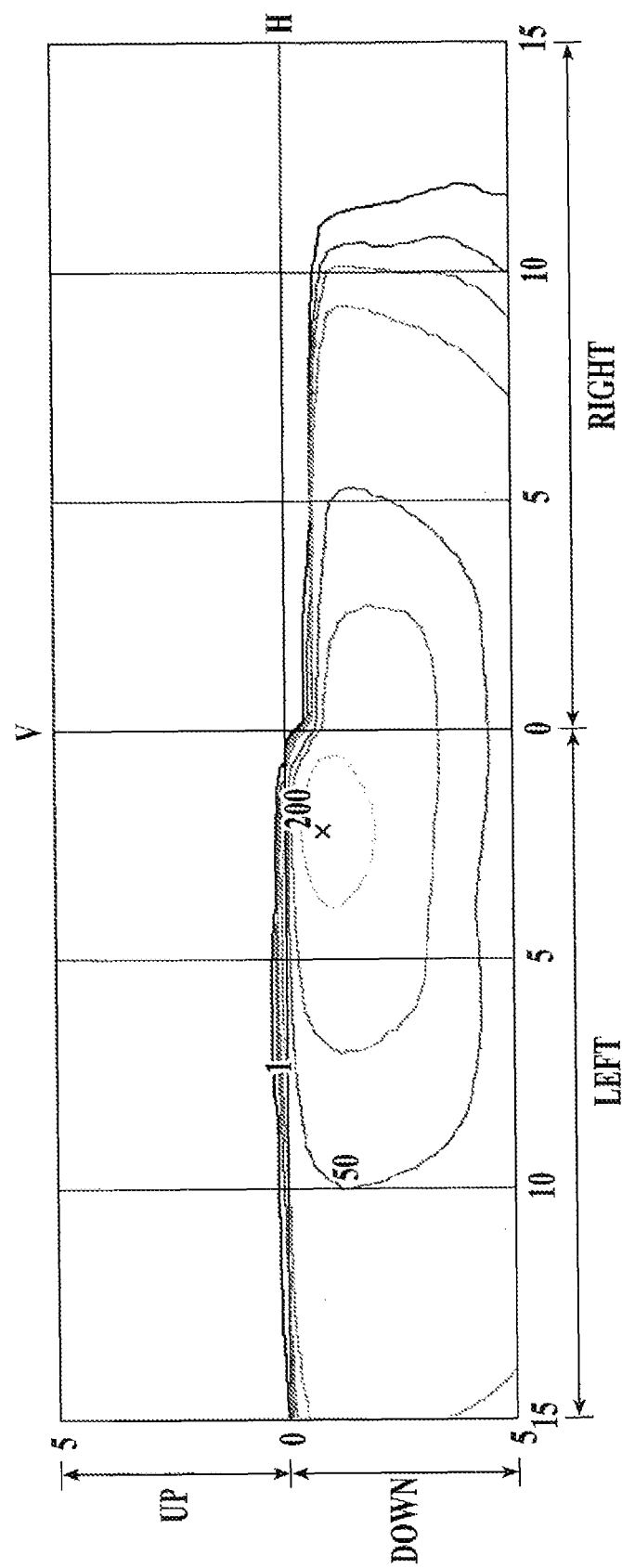
FIG. 9A  BEFORE HEAT RESISTANCE TEST

AFTER HEAT RESISTANCE TEST (COMPARATIVE EXAMPLE)

PROJECTOR-TYPE HEADLIGHT AND CONFIGURATION STRUCTURE OF RESIN PROJECTOR LENS THEREOF

This application claims the priority benefit under 35 U.S.C. §119 of Japanese Patent Application No. 2010-005747 filed on Jan. 14, 2010, which is hereby incorporated in its entirety by reference.

BACKGROUND

1. Field

The presently disclosed subject matter relates to a projector-type headlight and a configuration structure of a resin projector lens thereof, and especially to a projector-type headlight comprising a projector lens which is a resin molding, and a configuration structure of the resin projector lens.

2. Description of the Related Art

Conventionally, in a projector-type headlight, a light source is provided at a first focal point of an ellipsoidal reflection surface of a reflector or in the vicinity of the first focal point, a shade is provided at a second focal point of the ellipsoidal reflection surface or in the vicinity thereof, and a projector lens is provided on a front side of the second focal point (for example, refer to Japanese Patent Application Laid-Open Publication No. 2008-103192). In such a projector-type headlight, a light emitted from the light source is reflected by the ellipsoidal reflection surface, the reflected light is focused at the second focal point, a part of the reflected light is blocked by the shade, and the reflected light which is not blocked by the shade is projected forward by the projector lens. Since the part of the reflected light is blocked by the shade, a light distribution pattern when two vehicles pass each other, that is, a low beam, is formed.

As a light source of the projector-type headlight, a semiconductor light emitting device (for example, a light emitting diode), an electric discharge lamp (for example, a high intensity discharge (HID) lamp, a high pressure metal vapor discharge lamp, or the like), a halogen lamp, an incandescent lamp, or the like has been used. Because a wavelength spectrum of the electric discharge lamp, the halogen lamp, and the incandescent lamp contains a large amount of infrared elements, heat is absorbed by the projector lens and the projector lens comes to have a very high temperature. On the other hand, because light emitted from a semi-conductor light emitting device such as a light emitting diode does not contain infrared rays, the projector lens would not be heated to a high temperature.

Therefore, in a case where the electric discharge lamp or the like is used as the light source, the projector lens is molten if a resin molding is used as the projector lens, and due to this reason, a resin molding cannot be used for the projector lens. Meanwhile, in a case where a semi-conductor light emitting device is used as a light source, because of a reason that the light does not contain infrared rays, and the like, the projector lens would not molten even if the resin molding is used as the projector lens, and thus, one can use the resin molding for the projector lens.

Meanwhile, even in a case where the semi-conductor light emitting device is used as the light source, there is a possibility that the projector lens may be deformed due to the heat generated by the element itself or the like, even if the projector lens is not molten. If the projector lens is deformed, optical characteristics of the projector lens are changed and light distribution pattern may be negatively influenced.

SUMMARY

Therefore, one possible aspect of the presently disclosed subject matter is to provide an ability to reduce influence to the light distribution pattern even in a case where the projector lens is deformed.

According to an aspect of the presently disclosed subject matter, there is provided a projector-type headlight comprising:
 a light emitting device;
 a reflector having a reflection surface to reflect a light from the light emitting device forward;
 a projector lens to project the reflected light from the reflection surface forward, the projector lens being a resin molding; and
 a shade to form a light distribution pattern having a light-dark border line by blocking a part of the reflected light heading from the reflection surface to the projector lens, wherein
 a gate trace is formed in a circumference portion of the projector lens, and wherein
 the gate trace is provided lower than a horizontal surface on which a light axis of the projector lens passes through, and at the same time is provided in a state of being shifted either leftward or rightward from a vertical surface on which the light axis of the projector lens passes through.

According to another aspect of the presently disclosed subject matter, there is provided a configuration structure of a resin projector lens in a projector-type headlight, comprising:
 a gate trace formed in a circumference portion of the resin projector lens, wherein
 the gate trace is provided lower than a horizontal surface on which a light axis of the resin projector lens passes through, and at the same time is provided in a state of being shifted either leftward or rightward from a vertical surface on which the light axis of the resin projector lens passes through.

BRIEF DESCRIPTION OF DRAWINGS

The above and other characteristics, advantages and features of the presently disclosed subject matter will become more fully understood from the detailed description given hereinbelow and the appended drawings which are given by way of illustration only, and thus are not intended as a definition of the limits of the presently disclosed subject matter, and wherein:

FIG. 9A is an iso-illuminance diagrammatic view of a light distribution pattern formed on a virtual screen by use of a projector lens before the lens is heated;

DETAILED DESCRIPTION OF EXEMPLARY EMBODIMENTS

Figure 1:
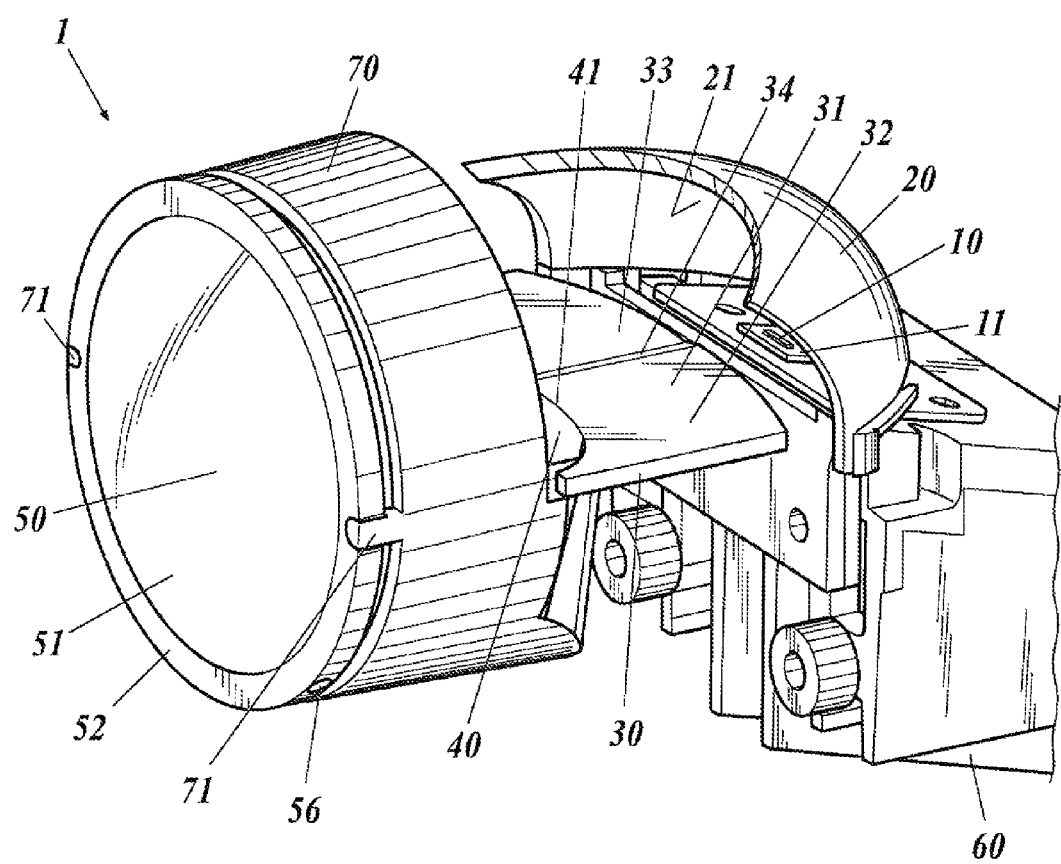
FIG. 1 is a perspective view of a projector-type headlight according to an embodiment of the presently disclosed subject matter.

Hereinafter, embodiments for implementing the presently disclosed subject matter will be explained with reference to the drawings. Although the following embodiments include various technical features for implementing the presently disclosed subject matter, this does not limit the scope of the disclosed subject matter to the following scope and examples shown in the drawings.

Moreover, "up", "down", "front", "rear", "left", and "right" in the following explanation respectively indicate "up", "down", "front", "rear", "left", and "right" of a vehicle on which a projector-type headlight is mounted. Accordingly, direction of right and left is determined when seen from rear to front.

Figure 2:
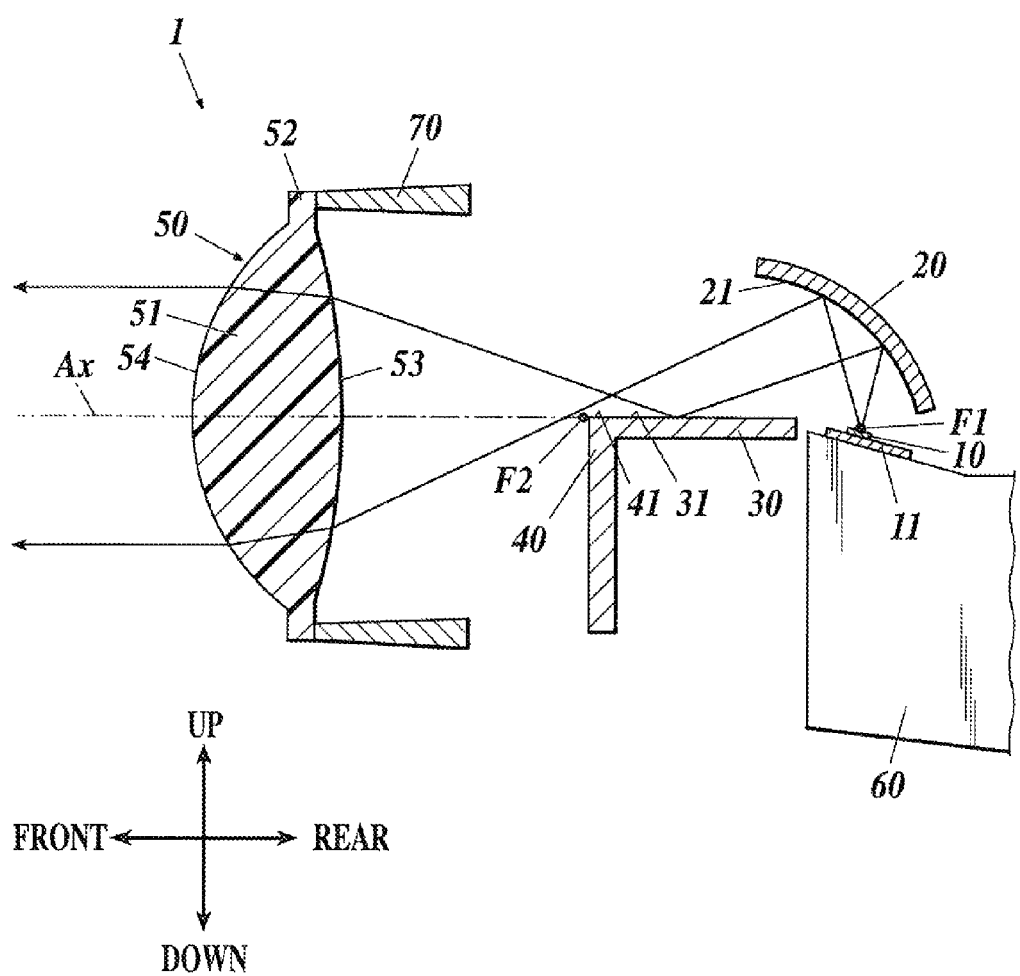
FIG. 2 is vertical cross-sectional view of the projector-type headlight of FIG. 1.
Figure 3:
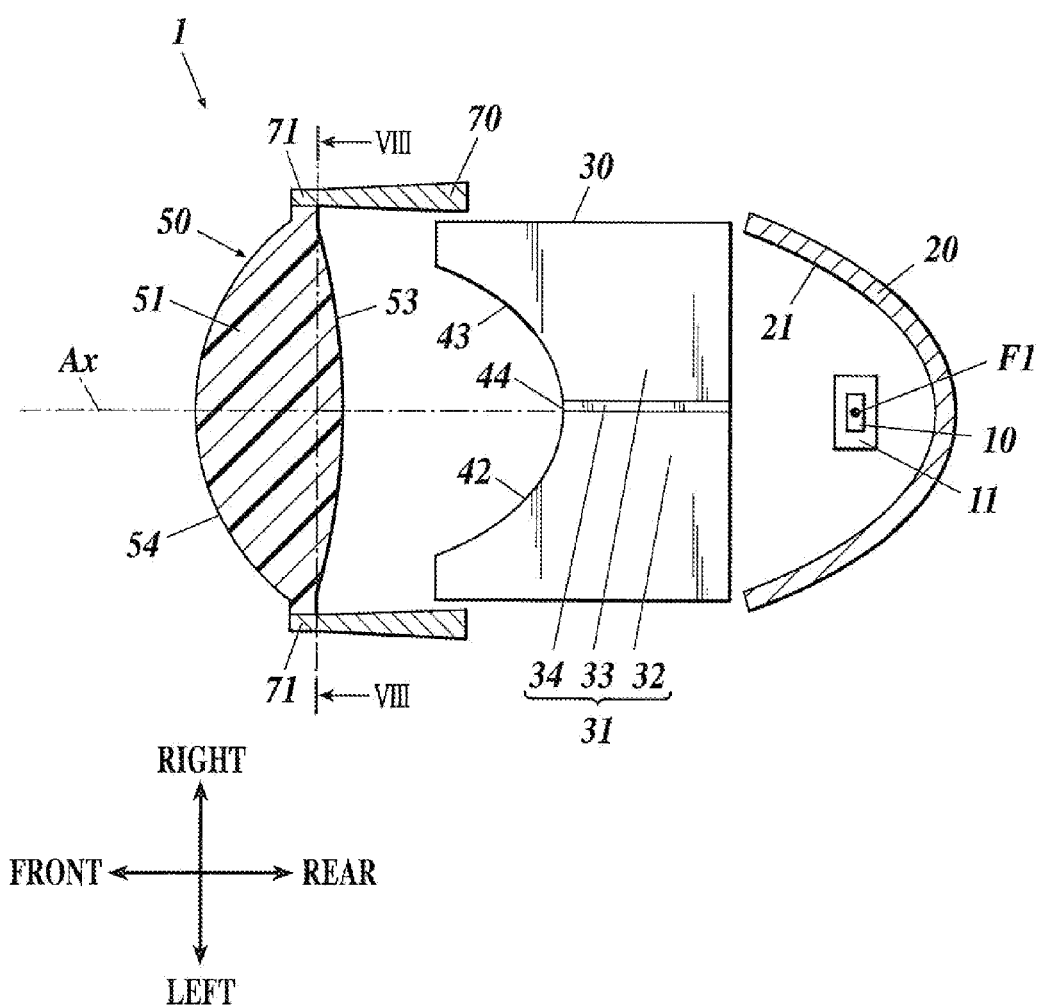
FIG. 3 is a horizontal cross-sectional view of the projector-type headlight of FIG. 1.

FIG. 1 is a perspective view of a projector-type headlight 1. FIG. 2 is a vertical cross-sectional view of the projector-type headlight 1. FIG. 3 is a horizontal cross-sectional view of the projector-type headlight 1. The projector-type headlight 1 includes a light emitting device 10, a first reflector 20, a second reflector 30, a shade 40, a projector lens 50, a heat sink 60, and the like.

If the projector-type headlight 1 is for left-hand traffic, left side is a driving lane while right side is an oncoming lane. If the projector-type headlight 1 is for right-hand traffic, right side is a driving lane while left side is an oncoming lane.

A light axis Ax of the projector lens 50 extends in front and rear directions. The shade 40, the heat sink 60, and the light emitting device 10 are provided behind the projector lens 50.

The light emitting device 10 is mounted on a circuit substrate 11, and the circuit substrate 11 is attached onto an upper surface of the heat sink 60, so that the light emitting device 10 faces upper and diagonally backward. When the light emitting device 10 is seen planarly from diagonally backward and above, the light emitting device 10 is provided in a rectangular shape and the long sides of the light emitting device 10 are leveled off while they are parallel to each other in right and left directions. The light emitting device 10 is a light emitting diode, an inorganic electroluminescence element, an organic electroluminescence element, or other type of a semi-conductor light emitting device.

The first reflector 20 is provided so as to surround the light emitting device 10 from back of the light emitting device 10 to diagonally forward above, diagonally forward right, and diagonally forward left of the element. On a concave surface on the front side of the first reflector 20, a reflection coating is formed by aluminum evaporation, silver coating, or the like, and the concave portion on the front side is a first reflection surface 21. The first reflection surface 21 is shaped to have an oval surface. An oval surface means an ellipsoid of revolution having an axis stretching in front and rear directions as a rotation axis, a complex ellipsoid, or a free-form surface based thereon. The complex ellipsoid means one having an oval-shaped vertical cross-section and having a parabolic or oval-shaped horizontal cross-section (focal point distance of the oval shape of the vertical cross-section and focal point distance of the oval shape of the horizontal cross-section differ from each other). Moreover, the rotation axis of the first reflection surface 21 may extend horizontally in front and rear directions or may be inclined downward in rear direction with respect to the horizontal surface. In a case where the rotation axis of the first reflection surface 21 extends horizontally in front and rear directions, the rotation axis of the first reflection surface 21 may match the light axis Ax of the projector lens 50 or may be slightly shifted out of the light axis Ax.

Since the first reflection surface 21 is formed to have an oval shape, the first reflection surface 21 has a first focal point F1 and a second focal point F2, which is provided closer to the front side than the first focal point F1. The light emitting device 10 is provided at the first focal point F1 of the first reflection surface 21, or in the vicinity thereof. The first reflection surface 21 reflects a light emitted from the light emitting device 10 and focuses the reflected light to the second focal point F2. Here, in a case where the first reflection surface 21 is formed to have a complex oval surface or a free-form surface based thereon, the second focal point F2 means a focal line. The focal line extends horizontally in right and left directions while center portion in the right and left directions is curved to project backward.

The shade 40 is provided in a plate-like manner. The shade 40 is provided in a condition where one surface of the shade 40 faces front and the other surface of the shade 40 faces rear. The shade 40 is curved to project backward to correspond to a curvature of the projector lens. The shade 40 is provided between the projector lens 50 and the light emitting device 10 so that an upper periphery 41 of the shade 40 is positioned at the second focal point F2 or in the vicinity thereof.

Of the upper periphery 41 of the shade 40, a portion which is on a left side from the light axis Ax (hereinafter referred to as a left side upper periphery 42) is formed to be horizontal, and a portion which is on a right side from the light axis Ax (hereinafter referred to as a right side upper periphery 43) is formed to be horizontal, so that there exists unevenness between the left side upper periphery 42 and the right side upper periphery 43. A portion 44 between the left side upper periphery 42 and the right side upper periphery 43 is inclined with respect to the horizontal direction (hereinafter referred to as an inclined portion 44). In one example, an inclined angle of the inclined portion 44 is 15° or 45° with respect to the horizontal surface.

Of the upper periphery 41 of the shade 40, a portion closer to the driving lane side from the light axis Ax is set higher than the portion closer to the oncoming lane side.

Specifically, in a case where the projector-type headlight 1 is for left-hand traffic, the left side upper periphery 42 of the shade 40 is positioned higher than the right side upper periphery 43 and the inclined portion 44 is inclined diagonally right down. In a case where the projector-type headlight 1 is for left-hand traffic, vertical position of the left side upper periphery 42 is slightly higher than the light axis Ax and vertical position of the right side upper periphery 43 approximately matches that of the light axis Ax.

Meanwhile, in a case where the projector-type headlight 1 is for right-hand traffic, the right side upper periphery 43 of the shade 40 is positioned higher than the left side upper periphery 42 and the inclined portion 44 is inclined diagonally left down. In a case where the projector-type headlight 1 is for right-hand traffic, vertical position of the right side upper periphery 43 is slightly higher than the light axis Ax and vertical position of the left side upper periphery 42 approximately matches that of the light axis Ax.

The second reflector 30 extends from the upper periphery of the shade 40 toward rear. A reflection coating is formed on an upper surface of the second reflector 30 by aluminum evaporation, silver coating, or the like, and the upper surface of the second reflector 30 is the second reflection surface 31. The second reflection surface 31 is a surface obtained by moving a line along the upper periphery 41 of the shade 40 horizontally rear in a parallel manner. Therefore, the second reflection surface 31 is configured by: a horizontal plain surface 32 obtained by moving the left side upper periphery 42 horizontally rear in a parallel manner; a horizontal plain 33 obtained by moving the right side upper periphery 43 horizontally rear in a parallel manner; and a plain surface 34 obtained by moving the inclined portion 44 horizontally rear in a parallel manner. The second reflection surface 31 reflects a light reflected by the first reflection surface 21 forward.

The projector lens 50 is provided in front of the shade 40. The projector lens 50 is a convex lens. The projector lens 50 is provided so that a focal point of the projector lens 50 is positioned at the second focal point F2 of the reflection surface 21 or in the vicinity thereof. Moreover, the upper periphery 41 of the shade 40 is positioned at the focal point of the projector lens 50 or in the vicinity thereof.

Figure 4:
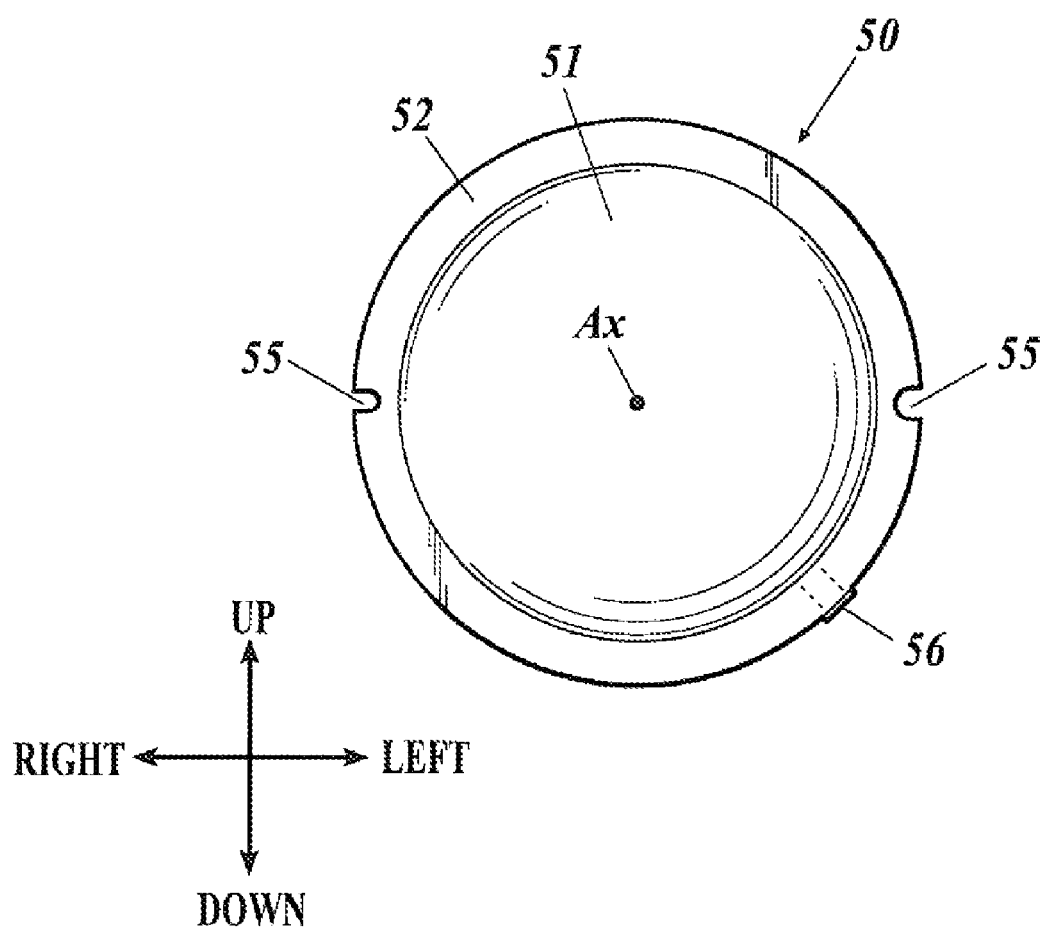
FIG. 4 is a front elevational view of a projector lens used for the projector-type headlight of FIG. 1.
Figure 5:
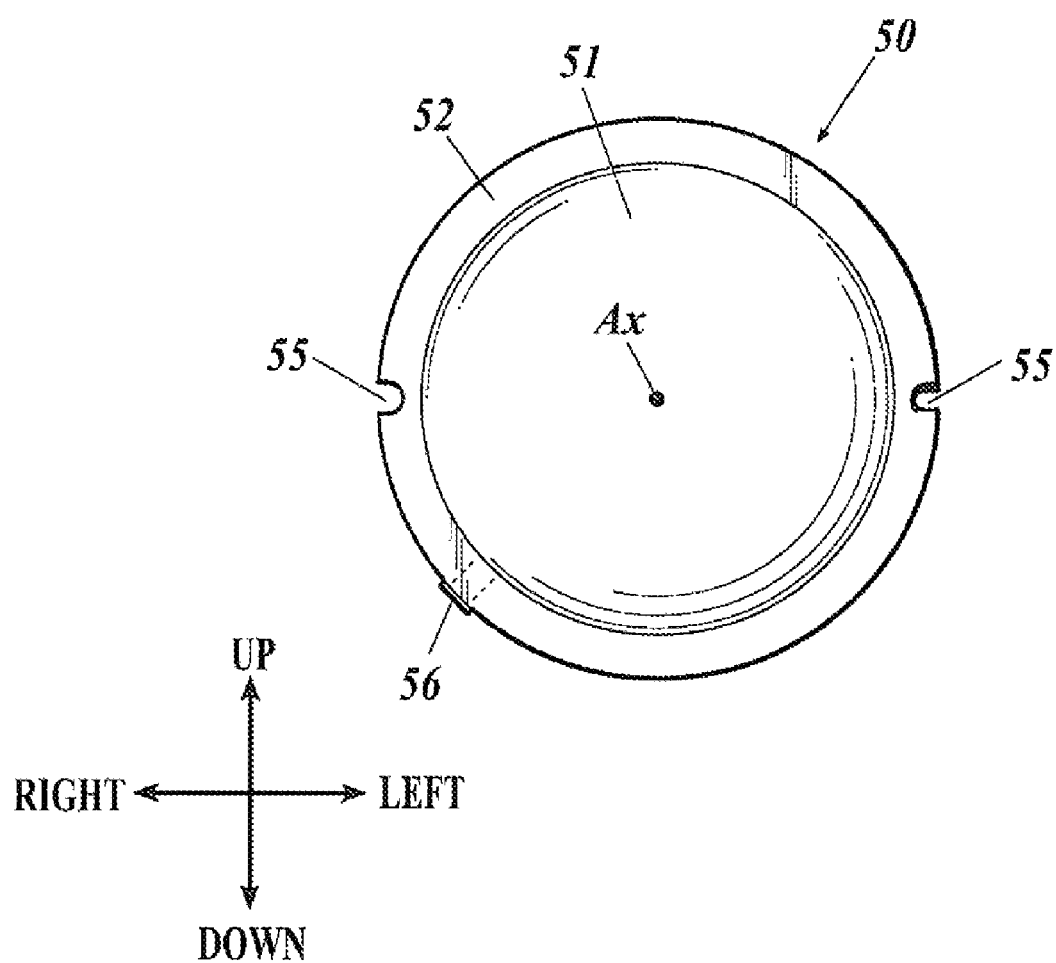
FIG. 5 is a front elevational view of a projector lens used for the projector-type headlight of FIG. 1.

FIG. 4 is a front elevational view of the projector lens 50 in a case where the projector-type headlight 1 is for left-hand traffic. FIG. 5 is a front elevational view of the projector lens 50 in a case where the projector-type headlight 1 is for right-hand traffic. As shown in FIGS. 1 to 5, the projector lens 50 includes a lens main body part 51 and a flange part 52 which protrudes from a circumference of the lens main body part 51 to outside of radial direction. An incidence surface 53 on back side of the lens main body part 51 has a concave surface which is not spherically shaped, and an exit surface 54 on the front side of the lens main body 51 has a concave surface which is not spherically shaped. Here, the projector lens 50 may be either a plane-convex lens or a meniscus convex lens.

A boss receiver 55 is respectively provided to both right and left sides of the flange part 52.

Meanwhile, a cylindrical lens holder 70 is provided in front of the shade 40. The lens holder 70 is provided so that shaft center of the lens holder 70 matches the front and rear directions, and front and rear portions of the lens holder 70 are opened. Boss 71 is respectively provided in a convex manner to both right and left sides of the front edge surface of the lens holder 70. The projector lens 50 is attached to the front edge of the lens holder 70 in a manner that the projector lens 50 shuts the front side aperture of the lens holder 70. Here, the flange part 52 of the projector lens 50 comes into contact with the front edge surface of the lens holder 70, and the boss 71 is fitted into the boss receiver 55.

The projector lens 50 is formed by mold injection by use of a thermal plastic resin having transparency, such as methacrylate resin (PMMA), polycarbonate resin (PC), or cycloolefin resin. Here, a cavity for the projector lens 50 is provided to a mold for forming the projector lens 50, and a gate for injecting resin into the cavity is extended from the circumference portion of the cavity (a portion corresponding to the flange part 52) to a radial direction. Therefore, a gate trace 56 is formed on the circumference portion of the projector lens 50 (circumference portion of the flange part 52). A gate trace is a trace where a gate portion of a molded article was cut, or in other words, the resin or other material located at a position at which the resin or other material entered a mold via an injection port to form the molded structure, and the location or residual structure where the molded structure is eventually broken free from the resin located in the injection port runner after solidification of the resin or other molding material.

The gate trace 56 is positioned lower than the horizontal surface on which the light axis Ax passes through (i.e., lower than a horizontal plane in which the light axis Ax is completely located in). Moreover, the gate trace 56 is positioned closer to the driving lane side than the vertical surface on which the light axis Ax passes through (i.e., closer to the driving lane side than a vertical plane in which the light axis Ax is completely located in). Here, as shown in FIG. 4, in a case where the projector-type headlight 1 is for left-hand traffic, the gate trace 56 is shifted leftward from the vertical surface on which the light axis Ax passes through. Specifically, the gate trace 56 is shifted leftward by 20° to 60° around the light axis Ax with the vertical surface on which the light axis Ax passes through being given as a benchmark. The gate trace 56 can be shifted by 40° leftward.

Meanwhile, in a case where the projector-type headlight 1 is for right-hand traffic, the gate trace 56 is shifted rightward from the vertical surface on which the light axis Ax passes through, as shown in FIG. 5. Specifically, the gate trace 56 is shifted rightward by 20° to 60° around the light axis Ax with the vertical surface on which the light axis Ax passes through being given as a benchmark. The gate trace 56 can be shifted by 40° rightward.

In the projector-type headlight 1, a light emitted from the light emitting device 10 is reflected forward by the first reflection surface 21, and the reflected light is focused to the second focal point F2. Part of the reflected light is blocked by the shade 40. Moreover, part of the reflected light is not blocked by the shade 40 and is incident into the projector lens 50. Further, part of the reflected light is reflected by the second reflection surface 31, and the reflected light reflected by the second reflection surface 31 is incident into the projector lens 50. The reflected light which is not blocked is projected forward by the projector lens 50. Thus, a light distribution pattern P1 shown in FIG. 6 or a light distribution pattern P2 shown in FIG. 7 is formed forward.

Figure 6:
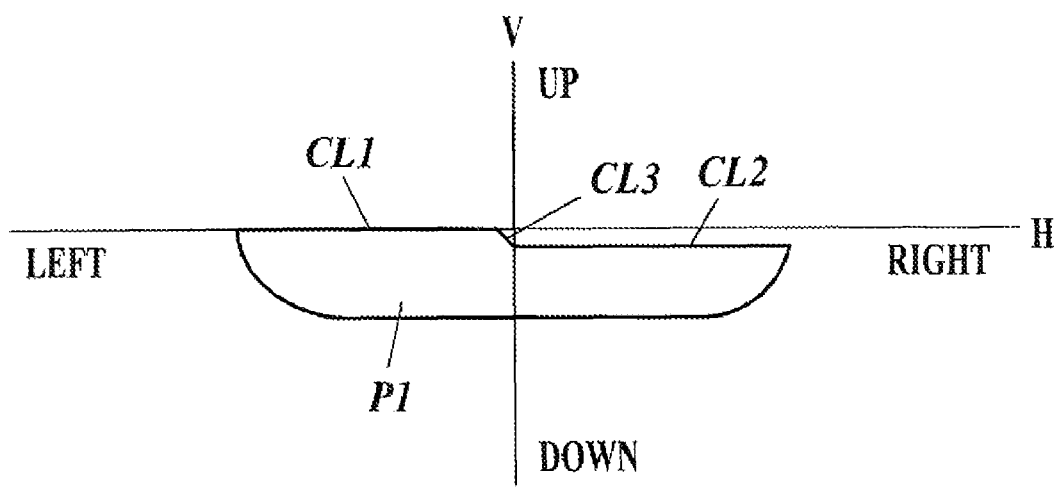
FIG. 6 is a view showing a light distribution pattern formed on a virtual screen by use of the projector lens shown in FIG. 4.

The light distribution patterns of the projector-type headlight 1 will be explained with reference to FIGS. 6 and 7. FIG. 6 is a schematic view showing a light distribution pattern formed by the projector-type headlight 1 on the virtual screen set forward with a predetermined distance in a case where the projector-type headlight 1 is for left-hand traffic. FIG. 7 is a schematic view showing a light distribution pattern formed by the projector-type headlight 1 on the virtual screen set forward with a predetermined distance in a case where the projector-type headlight 1 is for right-hand traffic. In FIGS. 6 and 7, a line H indicates a line of intersection of the horizontal surface on which the light axis Ax passes through and the virtual screen, and a line V indicates an intersection of the vertical surface on which the light axis Ax passes through and the virtual screen.

In a case where the projector-type headlight 1 is for left-hand traffic, as shown in FIG. 6, a light distribution pattern P1 having a cut-off line for separating a bright part and a dark part (light-dark borderline) on an upper periphery of the bright part is formed. In the light distribution pattern P1, the cut-off line on the upper periphery of the bright part includes: a driving lane side horizontal cut-off line CL1 which is on left side of the line V; an oncoming lane side horizontal cut-off line CL2 which is on right side of the line V; and a diagonal cut-off line CL3 which is diagonally leftward-upward from a left edge of the oncoming lane side horizontal cut-off line CL2. The driving lane side horizontal cut-off line CL1 is formed approximately along the line H, while the oncoming lane side horizontal cut-off line CL2 is formed in a position lower than the line H. The driving lane side horizontal cut-off line CL1 is formed by the right side upper periphery 43 of the shade 40. The oncoming lane side horizontal cut-off line CL2 is formed by the left side upper periphery 42 of the shade 40. The diagonal cut-off line CL3 is formed by the inclined portion 44 of the shade 40.

Figure 7:
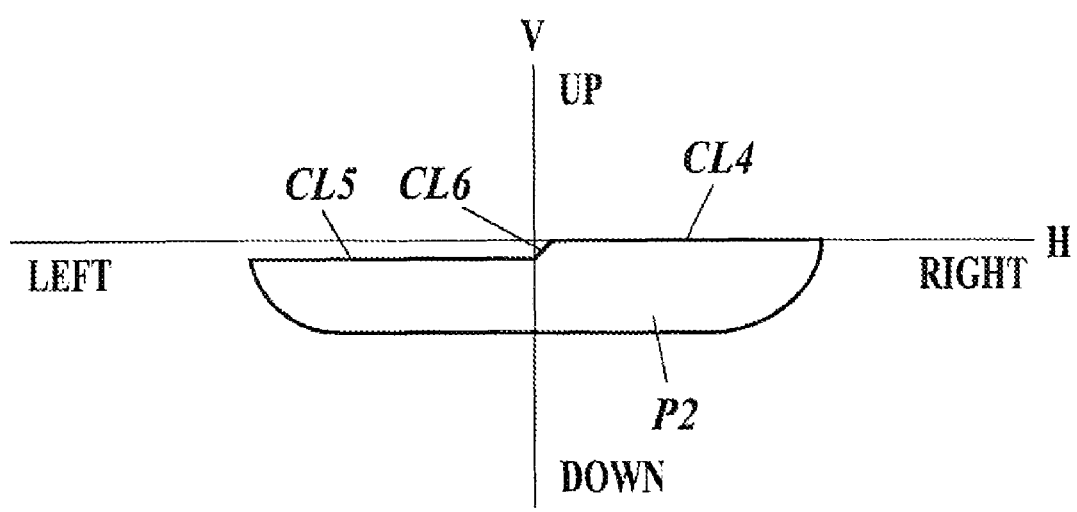
FIG. 7 is a view schematically showing the light distribution pattern formed on the virtual screen by use of the projector lens shown in FIG. 5.

In a case where the projector-type headlight 1 is for right-hand traffic, as shown in FIG. 7, a light distribution pattern P2 having a cut-off line for separating a bright part and a dark part (borderline) on an upper periphery of the bright part is formed. In the light distribution pattern P2, the cut-off line on the upper periphery of the bright part includes: a driving lane side horizontal cut-off line CL4 which is on right side of the line V; an oncoming lane side horizontal cut-off line CL5 which is on left side of the line V; and a diagonal cut-off line CL6 which is diagonally leftward-downward from a left edge of the driving lane side horizontal cut-off line CL4. The driving lane side horizontal cut-off line CL4 is formed approximately along the line H, while the oncoming lane side horizontal cut-off line CL5 is formed in a position lower than the line H. The driving lane side horizontal cut-off lane CL4 is formed by the left side upper periphery 42 of the shade 40. The oncoming lane side horizontal cut-off line CL5 is formed by the right side upper periphery 43 of the shade 40. The diagonal cut-off line CL6 is formed by the inclined portion 44 of the shade 40.

Figure 8:
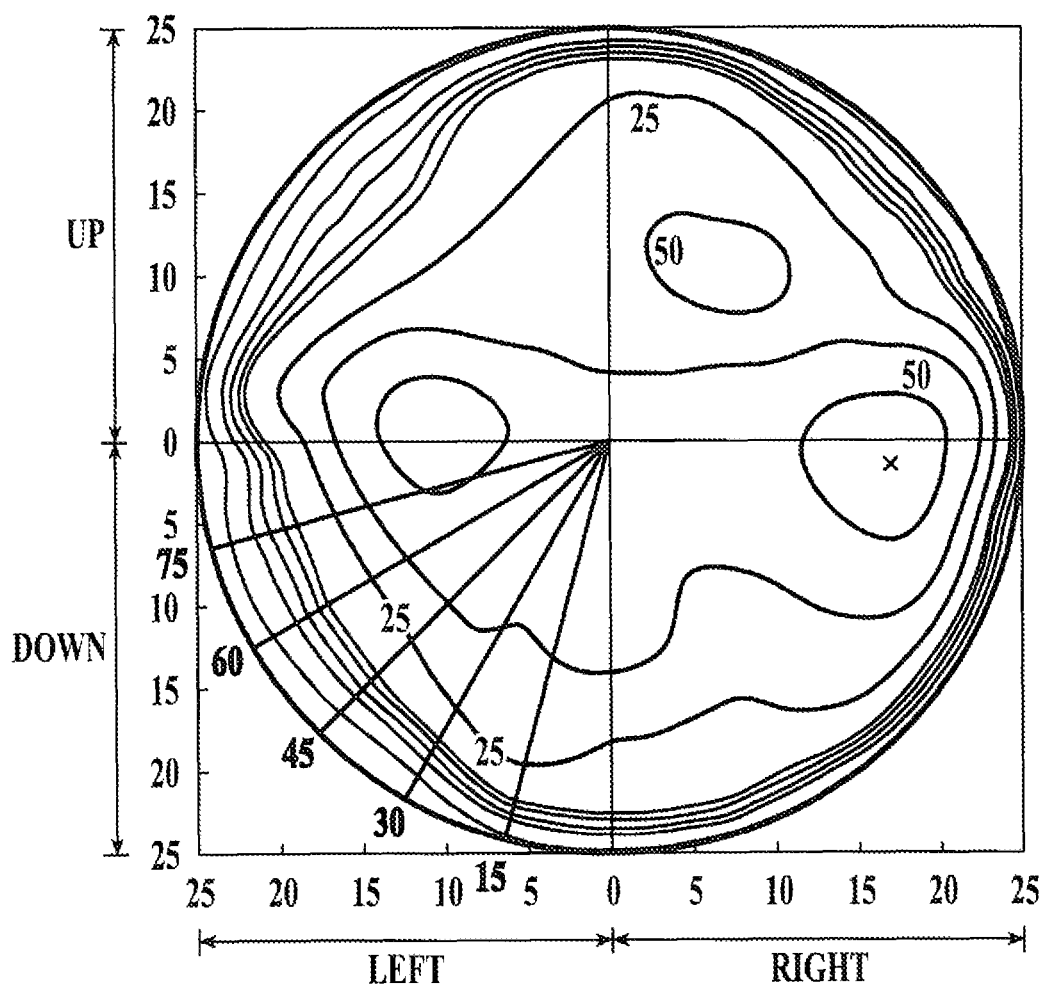
FIG. 8 is an iso-illuminance diagrammatic view showing illumination distribution on a surface along a VIII-VIII line shown in FIG. 3.

FIG. 8 shows illuminance distribution in the incident surface 53 behind the projector lens 50 in a case where the projector-type headlight 1 is for left-hand traffic. Since the left side upper periphery 42 of the shade 40 is positioned higher than the right side upper periphery 43, with regard to an area where light is blocked by the shade 40, left side part of the shade 40 is wider in upper direction than right side part. Therefore, as shown in FIG. 8, illuminance in left lower part of the projector lens 50 is lower than the other parts.

Here, when the projector-type headlight 1 is used for a long period of time, the projector lens 50 is deformed in the gate trace 56 the most, and the gate trace 56 is provided left lower portion. Due to this, left lower part of the incident surface 53 or the exit surface 54 is also deformed the most. Therefore, optical characteristics of the projector lens 50 are changed and the light distribution pattern P1 is influenced by the change. However, as shown in FIG. 8, since the illuminance at the left lower part of the projector lens 50 is lower than the other parts, even if the left lower part of the incident surface 53 or the exit surface 54 is deformed, influence to the light distribution pattern P1 can be reduced.

In a case where the projector-type headlight 1 is for right-hand traffic, since the gate trace 56 is provided at right lower portion, even if right lower part of the incident surface 53 or the exit surface 54 is deformed, illuminance in the right lower part of the projector lens 50 is lower than the other parts. Therefore, it becomes possible to reduce influence to the light distribution pattern P2. Here, in a case where the projector-type headlight 1 is for right-hand traffic, the illuminance distribution of the incident surface 53 behind the projector lens 50 is a minor-reversed version of the illuminance distribution shown in FIG. 8.

It is conceivable that follows are reasons why the projector lens 50, which is a resin molding, is heated by the heat of the light emitting device 10 and is most easily deformed in the vicinity of the gate trace 56.

When the projector lens 50 is injection-molded, high temperature resin flows through the gate and therefore, when the lens is cooled after molding, the gate portion of the molding is cooled at the end of the process. Then, the largest residual stress/residual strain is generated at the gate part. If the projector lens 50 is heated when being used, external deformation due to the residual stress/residual strain appears and as a result thereof, the lens is most easily deformed in the vicinity of the gate trace 56 which includes the residual stress/residual strain the most.

Embodiment 1

Hereinafter, embodiments of the presently disclosed subject matter will be explained.

Figure 9B:
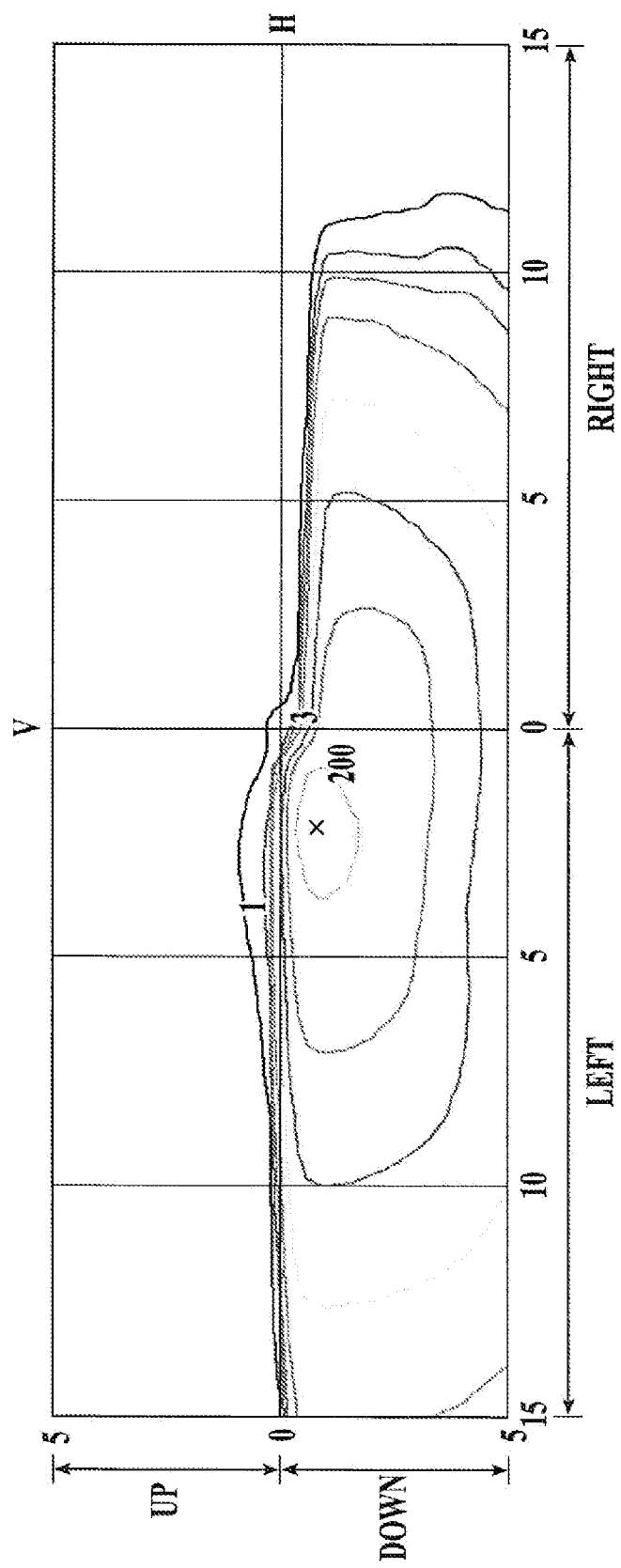
FIG. 9B is an iso-illuminance diagrammatic view of a light distribution pattern formed on a virtual screen by use of a projector lens, which was heated, while setting a gate trace of the projector lens to the position of 0°.
Figure 9C:
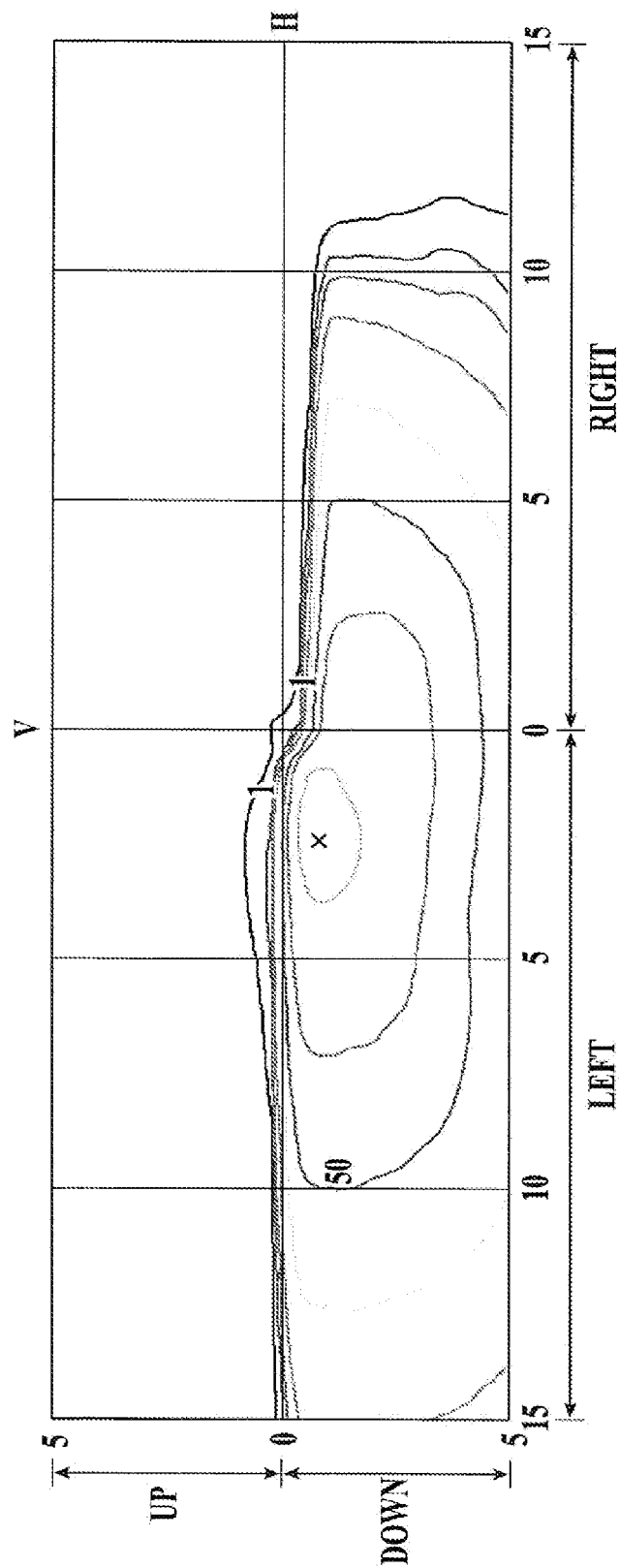
FIG. 9C is an iso-illuminance diagrammatic view of a light distribution pattern formed on a virtual screen by use of a projector lens, which was heated, while setting a gate trace of the projector lens to the position of 40°.

The virtual screen set forward with a predetermined distance from the projector-type headlight 1 is illuminated by the projector-type headlight 1 to measure illuminance on the virtual screen. Illuminance distribution obtained as a result thereof is shown in iso-illuminance diagrammatic views in FIGS. 9A to 9C. FIG. 9A is a result of a case where the projector-type headlight 1 is for left-hand traffic and an unused and unheated projector lens 50 which was mold injected is used. FIGS. 9B and 9C are results of cases where mold injected projector lens 50 was heated to 120° C., cooled to room temperature, and used as the projector lens 50 of the projector-type headlight 1 for left-hand traffic. In FIG. 9B, the gate trace 56 of the projector lens 50 is not shifted out of the vertical surface on which the light axis Ax passes through and shows a result when the gate trace 56 is positioned right below the light axis Ax (comparative example). FIG. 9C shows a result in a case where the gate trace 56 is shifted by 40° leftward around the light axis Ax with the vertical surface on which the light axis Ax passes through being given as a benchmark (example).

Figure 10:
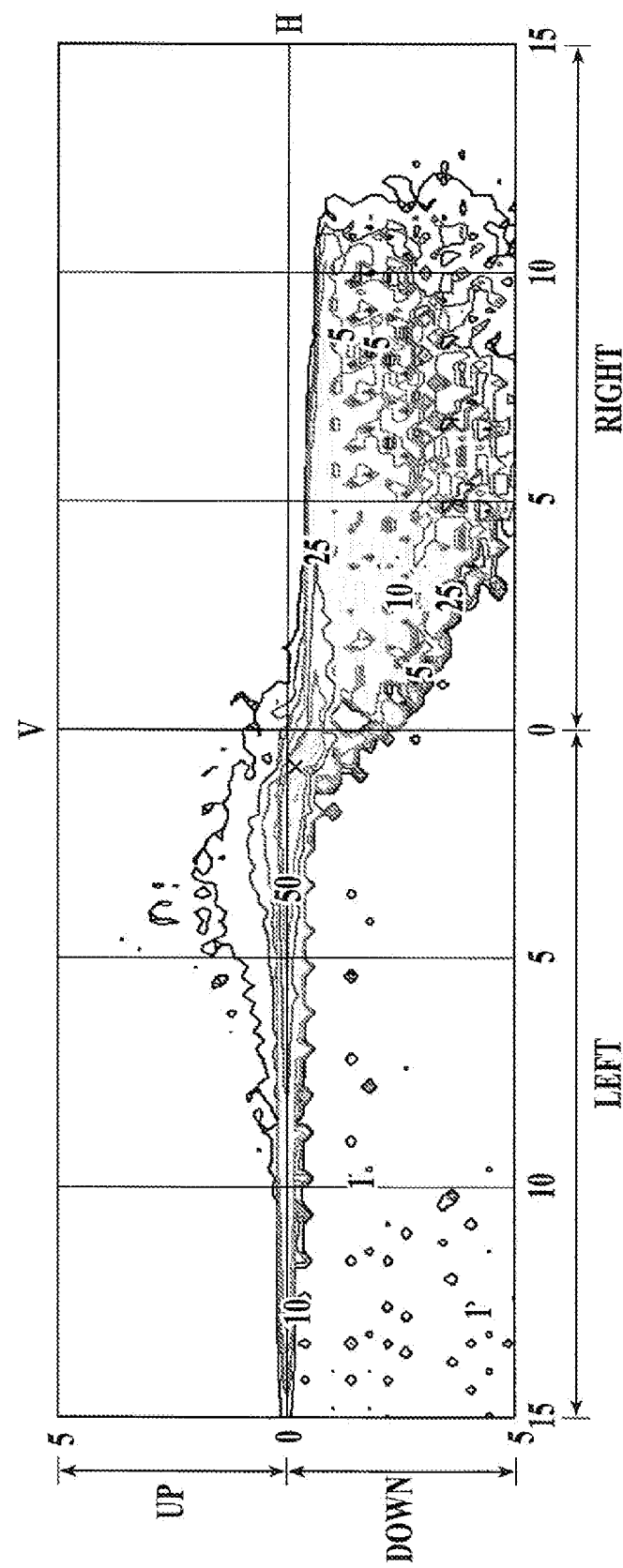
FIG. 10 is an iso-illuminance diagrammatic view showing distribution of difference between the illuminance of FIG. 9B and the illuminance of FIG. 9C.

FIG. 10 is an iso-illuminance diagrammatic view obtained by subtracting the illuminance of FIG. 9C from the illuminance of FIG. 9B at one same point in FIGS. 9B and 9C.

It is evident from FIGS. 9A to 9C and 10 that the illuminance in FIG. 9B is lower than the illuminance in FIG. 9C in a side upper than the line H in the driving lane side from the line V. Therefore, it is understood that glare occurs more easily in a case where the gate trace 56 is positioned right below the light axis Ax (the case of FIG. 9B). On the other hand, it is understood that glare does not easily occur in a case where the gate trace 56 is shifted by 40° leftward around the light axis Ax (the case of FIG. 9C).

Embodiment 2

Figure 11:
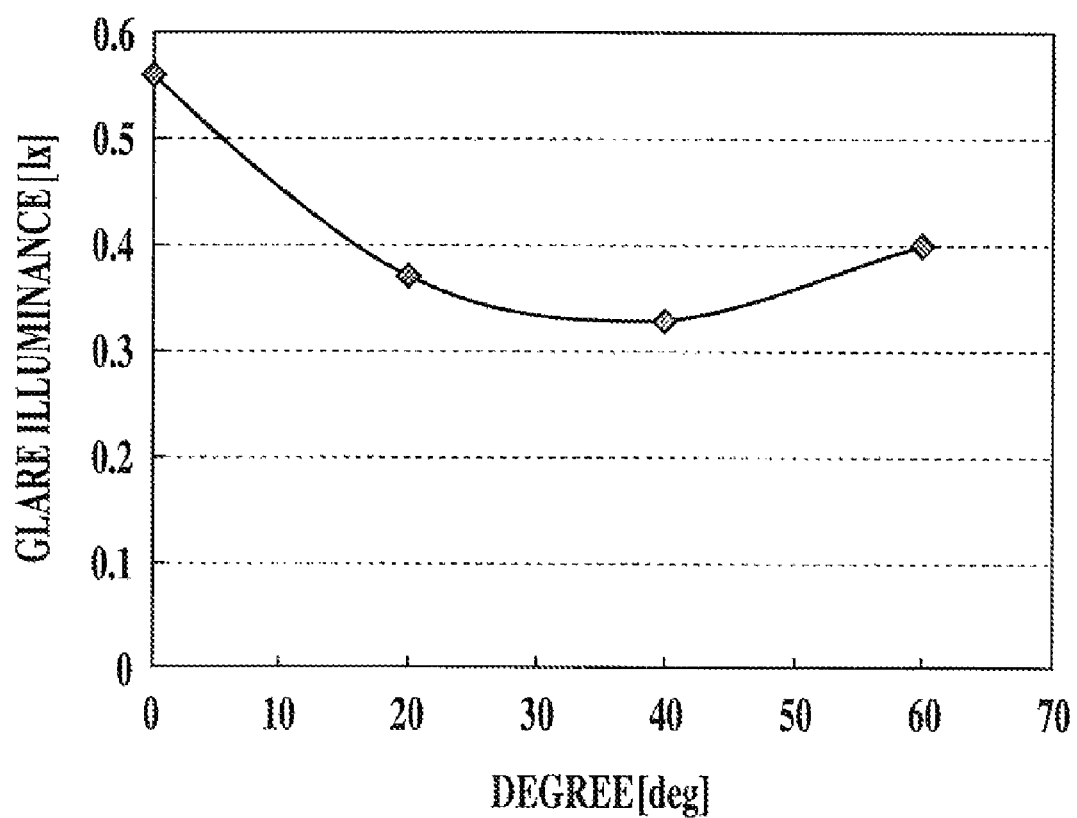
FIG. 11 is a graph showing a relation between setting angle of the projector lens and illuminance in a predetermined area of the virtual screen in a case where the projector lens after being heated is used to illuminate the virtual screen.
Figure 12:
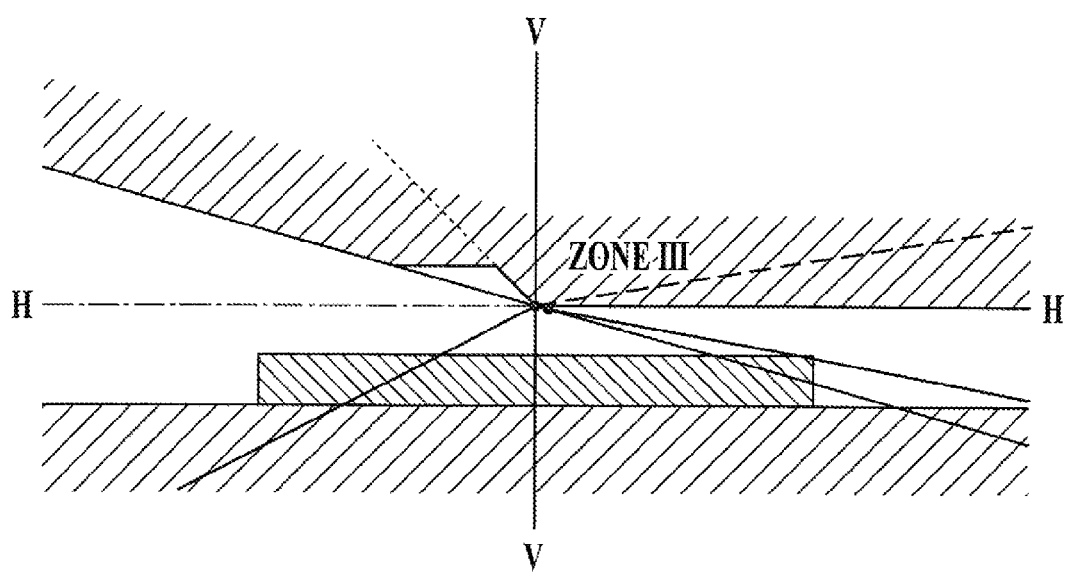
FIG. 12 is a view showing the virtual screen according to a predetermined specification.

Illuminance in ZONE III according to No. 112 of ECE standards was measured in a case where the projector-type headlight 1 is for left-hand traffic and position of the projector lens 50 around the light axis Ax (the projector lens 50 was heated up to 120° C. and cooled to room temperature) was changed. Result of the measurement is shown in FIG. 11. In FIG. 11, horizontal axis indicates rotation angle of the gate trace 56 around the light axis Ax with the vertical surface on which the light axis Ax passes through being given as a benchmark, and vertical axis indicates illuminance of the zone III.

According to No. 112 of the ECE standards, a product does not meet the standards if illuminance in the ZONE III is 0.7

[1×] or more. As evident from FIG. 11, it is understood that a margin of 20% or more of standards cannot be ensured, in a case where the gate trace 56 is provided right below the light axis Ax and the rotation angle of the gate trace 56 around the light axis Ax with the vertical surface on which the light axis Ax passes through being given as a benchmark is zero. On the other hand, it is understood that a margin of 20% or more of standards can be ensured, in a case where the gate trace 56 is shifted by 20° to 60° leftward around the light axis Ax with the vertical surface on which the light axis Ax passes through being given as a benchmark. Therefore, it is understood that if the gate trace 56 is shifted by 20° to 60° leftward around the light axis Ax with the vertical surface on which the light axis Ax passes through being given as a benchmark, glare does not easily occur.

According to an aspect of an exemplary embodiment of the presently disclosed subject matter, there is provided a projector-type headlight comprising:

a light emitting device;

a reflector having a reflection surface to reflect a light from the light emitting device forward;

a projector lens to project the reflected light from the reflection surface forward, the projector lens being a resin molding; and a shade to form a light distribution pattern having a light-dark border line by blocking a part of the reflected light heading from the reflection surface to the projector lens, wherein a gate trace is formed in a circumference portion of the projector lens, and wherein the gate trace is provided lower than a horizontal surface on which a light axis of the projector lens passes through, and at the same time is provided in a state of being shifted either leftward or rightward from a vertical surface on which the light axis of the projector lens passes through.

The shade can be provided between the light emitting device and the projector lens so that an upper periphery of the shade is positioned at a focal point of the projector lens or in a vicinity of the focal point, wherein a portion of the upper periphery of the shade which is closer to a driving lane side from the light axis of the projector lens is set higher than a portion in an oncoming lane side, and wherein the gate trace is provided closer to the driving lane side than the vertical surface on which the light axis of the projector lens passes through.

The gate trace can be shifted either leftward or rightward by 20° to 60° around the light axis with the vertical surface on which the light axis of the projector lens passes through being given as a benchmark.

The gate trace can be shifted either leftward or rightward by 40° around the light axis with the vertical surface on which the light axis of the projector lens passes through being given as a benchmark.

According to another aspect of an exemplary embodiment of the presently disclosed subject matter, there is provided a configuration structure of a resin projector lens in a projector-type headlight, comprising:

a gate trace formed in a circumference portion of the resin projector lens, wherein the gate trace is provided lower than a horizontal surface on which a light axis of the resin projector lens passes through, and at the same time is provided in a state of being shifted either leftward or rightward from a vertical surface on which the light axis of the resin projector lens passes through.

According to the embodiment of the presently disclosed subject matter, although the projector lens is most easily deformed in the vicinity of a gate trace, because the gate trace is provided lower than a horizontal surface on which a light axis passes through, and the gate trace is provided in a state of being shifted leftward or rightward from a vertical surface on which the light axis passes through, illuminance in a portion which is easily deformed can be reduced. Therefore, it becomes possible to reduce influence to the light distribution pattern by the deformation of projector lens.

The entire disclosure of Japanese Patent Application No. 2010-005747 filed on Jan. 14, 2010 including description, claims, drawings, and abstract are incorporated herein by reference in its entirety.

Although various exemplary embodiments have been shown and described, the invention is not limited to the embodiments shown. Therefore, the scope of the invention is intended to be defined solely by the scope of the claims that follow.

What is claimed is:

1. A projector-type headlight comprising:
   a light emitting device;
   a reflector having a reflection surface configured to reflect light from the light emitting device forward as reflected light;
   a projector lens configured to project the reflected light received from the reflection surface forward, the projector lens being a resin molding; and
   a shade configured to form a light distribution pattern having a light-dark border line by blocking a part of the reflected light heading from the reflection surface to the projector lens, wherein
   a gate trace located in a circumference portion of the projector lens, and wherein
   the gate trace is located at a position lower than a horizontal plane in which a light axis of the projector lens is located, and at the same time is provided in a state of being shifted either leftward or rightward from a vertical plane in which the light axis of the projector lens is located.

2. The projector-type headlight according to claim 1, wherein the shade is provided between the light emitting device and the projector lens so that an upper periphery of the shade is positioned substantially at a focal point of the projector lens, wherein
   a portion of the upper periphery of the shade which is closer to a driving lane side from the light axis of the projector lens is set higher than a portion in an oncoming lane side, and wherein
   the gate trace is provided closer to the driving lane side than the vertical plane in which the light axis of the projector lens is located.

3. The projector-type headlight according to claim 1, wherein the gate trace is shifted either leftward or rightward by 20° to 60° around the light axis with the vertical plane in which the light axis of the projector lens is located serving as a benchmark.

4. The projector-type headlight according to claim 2, wherein the gate trace is shifted either leftward or rightward by 20° to 60° around the light axis with the vertical plane in which the light axis of the projector lens is located serving as a benchmark.

5. The projector-type headlight according to claim 1, wherein the gate trace is shifted either leftward or rightward by 40° around the light axis with the vertical plane in which the light axis of the projector lens is located serving as a benchmark.

6. The projector-type headlight according to claim 2, wherein the gate trace is shifted either leftward or rightward by 40° around the light axis with the vertical plane in which the light axis of the projector lens is located serving as a benchmark.

7. A configuration structure of a resin projector lens in a projector-type headlight, comprising:
a gate trace formed in a circumference portion of the resin projector lens, wherein
the gate trace is located lower than a horizontal plane in which a light axis of the resin projector lens is located, and at the same time is located in a state of being shifted either leftward or rightward from a vertical plane in which the light axis of the resin projector lens is located.

* * * * *